(12) United States Patent
Knapp

(10) Patent No.: US 6,871,817 B1
(45) Date of Patent: Mar. 29, 2005

(54) SYSTEM CONTAINING AN ANAMORPHIC OPTICAL SYSTEM WITH WINDOW, OPTICAL CORRECTOR, AND SENSOR

(75) Inventor: David J. Knapp, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/695,000

(22) Filed: Oct. 28, 2003

(51) Int. Cl.⁷ .............................. F41G 7/00; F42B 15/01
(52) U.S. Cl. ...................... 244/3.16; 244/3.1; 244/3.15; 244/3.17
(58) Field of Search ................... 244/3.1–3.3; 359/613, 359/711; 356/5.07

(56) References Cited

U.S. PATENT DOCUMENTS

| | | | |
|---|---|---|---|
| 4,245,890 A | 1/1981 | Hartman et al. | |
| 4,384,759 A | 5/1983 | Ferrante | |
| 4,641,927 A | 2/1987 | Prescott et al. | |
| 5,526,181 A * | 6/1996 | Kunick et al. | ............. 359/613 |
| 5,530,539 A * | 6/1996 | Hug | ............. 356/5.07 |
| 5,677,508 A | 10/1997 | Finn et al. | |
| 5,946,143 A | 8/1999 | Whalen | |
| 6,009,564 A | 1/2000 | Tackles et al. | |
| 6,028,712 A | 2/2000 | McKenney et al. | |
| 6,201,230 B1 * | 3/2001 | Crowther et al. | ............. 244/3.16 |
| 6,310,730 B1 | 10/2001 | Knapp et al. | |
| 6,313,951 B1 | 11/2001 | Manhart et al. | |
| 6,343,767 B1 | 2/2002 | Sparrold et al. | |
| 6,356,396 B1 * | 3/2002 | Chen et al. | ............. 359/711 |
| 6,462,889 B1 | 10/2002 | Jackson | |
| 6,552,318 B1 | 4/2003 | Crowther et al. | |

* cited by examiner

Primary Examiner—Bernarr E. Gregory
(74) Attorney, Agent, or Firm—Thomas J. Finn; Leonard A. Alkov; Karl A. Vick

(57) ABSTRACT

A system includes an optical system having a curved window with anamorphic symmetry about a first plane and a second plane perpendicular to the first plane. The window may be, for example, in a flight vehicle such as a missile. An optical corrector is adjacent to a curved inner surface of the window and has an optical corrector shape responsive to a shape of the window. The optical corrector has anamorphic symmetry about the first plane and the second plane. A sensor is disposed to receive an optical ray passing sequentially through the window and the optical corrector.

18 Claims, 2 Drawing Sheets

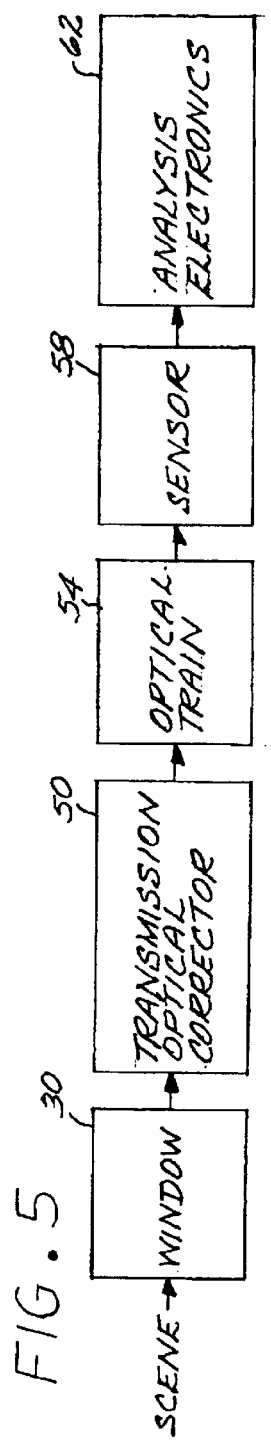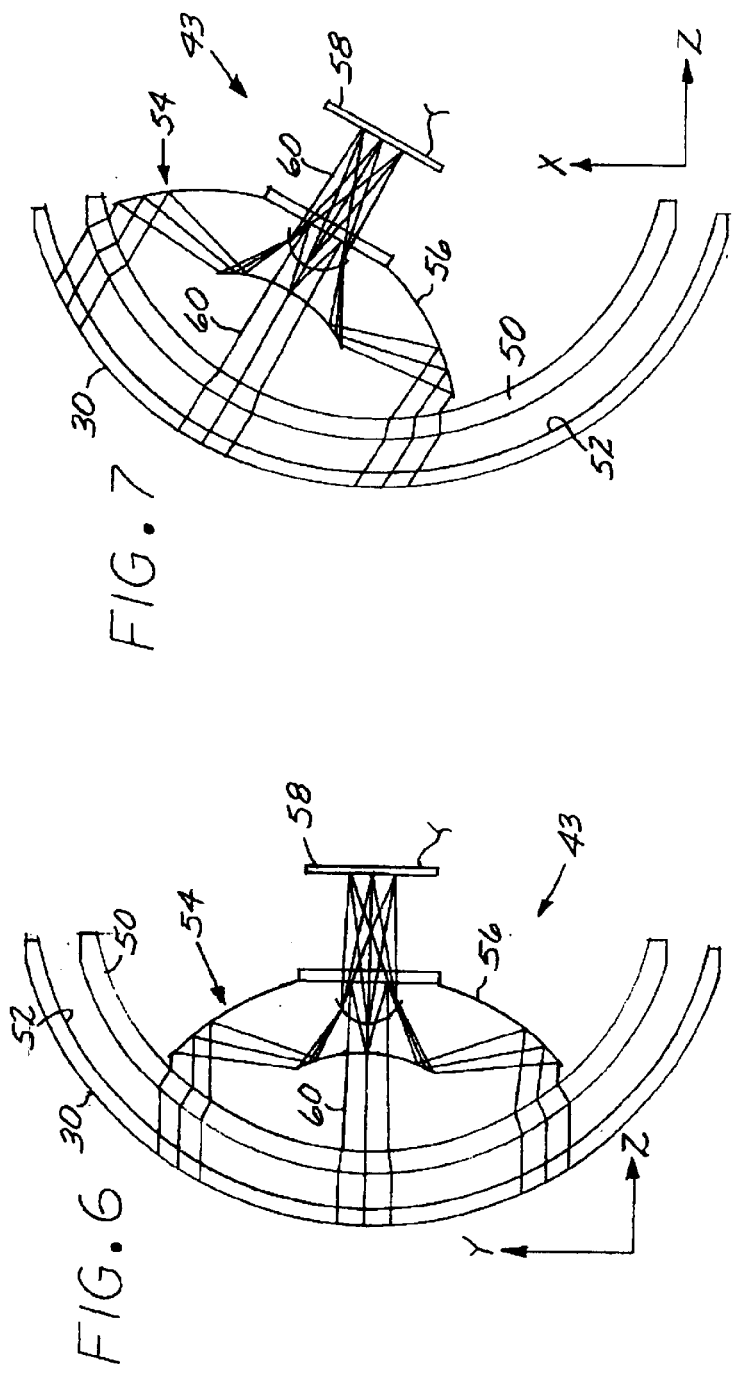

SYSTEM CONTAINING AN ANAMORPHIC OPTICAL SYSTEM WITH WINDOW, OPTICAL CORRECTOR, AND SENSOR

This invention relates to an optical system with anamorphic symmetry and, more particularly, to a system that uses such an anamorphic optical system such as an anamorphic-symmetry missile.

BACKGROUND OF THE INVENTION

Many advanced missiles utilize a forward-facing optical sensor to guide the missile to its target. The sensor (or, equivalently for the present purposes, a portion of the optical train that directs the incoming optical rays from the scene to the sensor) is usually pivotably mounted so that the sensor may be directed to point in directions other than along the boresight axis of the missile. The sensor views the scene in front of the missile through a forward-facing window. The window protects the sensor from the high-velocity air stream and from ice, water droplets, and other solid or liquid particles that are present in the air.

In early high-velocity missiles, the window was typically shaped as a segment of a sphere. The sensor was effectively positioned at the center of curvature of the spherical window. In this arrangement, the sensor faced along a radius of the sphere at all pointing angles, so there was no distortion of the optical rays as a function of the pointing angle other than those due to imperfections in the window material.

The window is typically the most forwardly positioned element of the missile, and the spherical window shape can impose a significant aerodynamic drag on the missile. In more advanced missiles, the window is streamlined to reduce the aerodynamic drag, the non-spherical window being termed a "conformal" window. However, the use of the nonspherical, conformal window results in the optical rays reaching the sensor being distorted according to the pointing angle of the sensor.

Since the shape of the conformal window is largely determined by aerodynamic considerations, it cannot be significantly reshaped to reduce the angle-dependent distortion that reaches the sensor. The distortion can to some extent be compensated for computationally in the computer that processes the image. However, such distortion-compensation computations require large computing power and can interfere with the primary target recognition functions.

To reduce the distortion in the optical rays that reach the sensor, an optical corrector may be placed between the window and the sensor. The optical corrector has a spatially dependent shape that corrects the optical rays for distortions introduced as the optical rays pass through the window, as a function of the pointing angle of the sensor. The optical corrector thus functions somewhat in the manner of eyeglasses worn by a human being.

The existing optical corrector technology has worked well for the current generation of missiles. Conformal windows and appropriate optical correctors have been designed and developed responsive to the designs of the current missiles, and significantly improve their performance. Examples of such optical correctors are found in U.S. Pat. Nos. 5,946,143; 6,009,564; 6,028,712; 6,310,730; 6,313,951; 6,343,767; 6,462,889; and 6,552,318, all of whose disclosures are incorporated by reference.

However, further changes to the designs of future generations of missiles may require further adaptations to the window designs, and thence to the corrector designs. Conversely, improvements in window design and corrector design may permit improvements in missile design. There is accordingly a need for improved cooperative missile, window, and corrector designs that produce improved capabilities of the overall system. The present invention fulfills this need, and further provides related advantages.

SUMMARY OF THE INVENTION

The present invention provides an optical system including a window and corrector with anamorphic symmetry. The availability of such an optical system allows the design of the missile to be modified to produce improved performance. The present approach thus represents a joint optimization of missile design and optical system design, for improved performance of the overall system. This approach may also be used in relation to optical systems for other applications.

In accordance with the invention, a system comprises an optical system, wherein the optical system in turn comprises a curved window having anamorphic symmetry about a first plane and a second plane perpendicular to the first plane, and an optical corrector adjacent to a curved inner surface of the window. The optical corrector is preferably a transmission optical corrector, but may be a reflective optical corrector. The optical corrector has an optical corrector shape responsive to a shape of the window. The optical corrector also has anamorphic symmetry about the first plane and the second plane. The optical corrector may be a fixed optical corrector or a movable optical corrector. The optical system further includes a sensor disposed to receive an optical ray passing sequentially through the window and the optical corrector. The sensor may be a manufactured sensor or a natural sensor such as a human eye. Desirably, the sensor has a field of regard of at least about 10 degrees through the window, the optical corrector, and the optical train.

For many applications, the system further includes an optical train positioned such that the optical corrector lies in an optical path of the optical rays between the window and the optical train. The optical train includes at least one reflective or refractive optical element operable to alter the optical ray incident thereon. In this case, the sensor is disposed to receive the optical ray passing sequentially through the window, the optical corrector, and the optical train.

The window may be a window in a flight vehicle. An example is a forwardly facing window of an unmanned vehicle. It may instead be a window in a manned flight vehicle.

The anamorphic symmetry of the window allows it to have a non-circular window periphery. Thus, in one case the window has a central axis along an intersection of the first plane and the second plane. A window periphery width measured from the central axis perpendicular to the first plane is greater than a window periphery height measured from the central axis perpendicular to the second plane.

An important consequence of the anamorphic symmetry of the window and noncircular window periphery is that the window may be used with an anamorphic-symmetry airframe fuselage having a fuselage forward end with a forward-end periphery of substantially the same shape and size as the window periphery. The window periphery is joined to the forward-end periphery of the missile fuselage in a smoothly faired aerodynamic joint that has acceptable aerodynamic characteristics.

U.S. Pat. No. 5,677,508, whose disclosure is incorporated by reference, describes important technical advantages that may be realized in missiles having a rearward portion of their fuselages non-circular. Typically in the disclosed approach, the aft portion of the missile fuselage is wider than its height. This approach has not heretofore been extendable to a missile design where the forward portion of the fuselage has a non-circular shape and the missile guidance requires a forwardly facing conformal window at the forward end of the missile, because there was no technique available for the joint design and optimization of the conformal window, the optical system including the optical corrector, and the fuselage of the missile. The present approach provides such a technique.

Thus, in a preferred embodiment of the present invention, a system comprises an airframe fuselage, such as a missile fuselage, having a fuselage forward end with a forward-end periphery of anamorphic symmetry about a first plane and a second plane perpendicular to the first plane. The airframe fuselage has a forward-end width measured perpendicular to the first plane, and a forward-end height measured perpendicular to the second plane and different from the forward-end width. The system further includes a forward-facing optical system. The optical system includes a window having anamorphic symmetry about the first plane and the second plane. The window has a window periphery with a window periphery width that is substantially the same as the forward-end width of the airframe fuselage, and a window periphery height that is substantially the same as the forward-end height of the airframe fuselage. The window periphery is affixed to the forward-end periphery of the airframe fuselage. An optical corrector is adjacent to a curved inner surface of the window and has an optical corrector shape responsive to a shape of the window. The optical corrector has anamorphic symmetry about the first plane and the second plane. The optical system further includes an optical train positioned such that the optical corrector lies between the window and the optical train. The optical train includes at least one optical element operable to alter an optical ray incident thereon. A sensor is disposed to receive an optical ray passing sequentially through the window, the optical corrector, and the optical train. Other compatible features may be used with this embodiment.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a block diagram of the optical system;

FIG. 6 is an x-axis view of an embodiment of the optical system; and

FIG. 7 is a y-axis view of the optical system of FIG. 6.

DETAILED DESCRIPTION OF THE INVENTION

Figure 1:
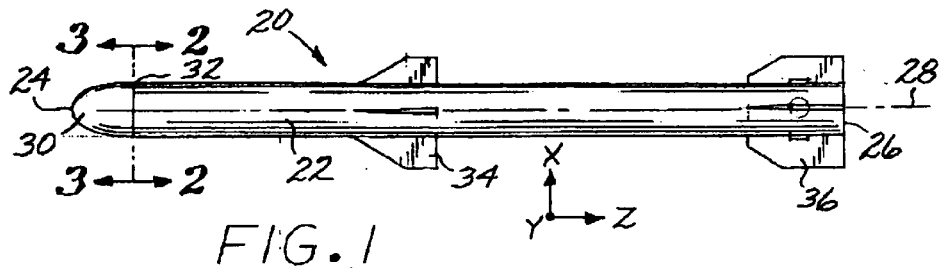
FIG. 1 is a side elevational view of a missile.

FIG. 1 depicts a missile system 20 having a fuselage 22, a nose 24, a tail 26, and a missile axis of elongation 28 (which is also the boresight axis of the missile). A transparent window 30 forms the nose of the missile system 20. The window 30 is joined to the fuselage 22 at a forward end 32 of the fuselage 22. Four fixed winglets 34 extend outwardly from the fuselage 22 at a location intermediate between the nose 24 and the tail 26 and are equally spaced 90 degrees from each other around the periphery of the fuselage 22. Four moveable control surfaces 36 extend outwardly from the fuselage 22 at a location adjacent to the tail 26 and are equally spaced 90 degrees from each other around the periphery of the fuselage 22. This embodiment of the missile system is only an example of a missile configuration, and there are many other operable configurations of unmanned aircraft such as missiles and manned aircraft with which the present approach is operable. The present approach is also operable with systems other than missiles and aircraft, such as personal vision systems (e.g., eyeglasses), underwater camera systems, endoscopic windows, and miniature cameras.

Figure 2:
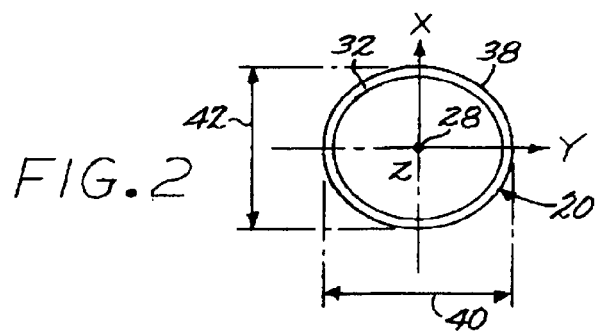
FIG. 2 is a sectional view of the missile of FIG. 1, taken on line 2—2.
Figure 3:
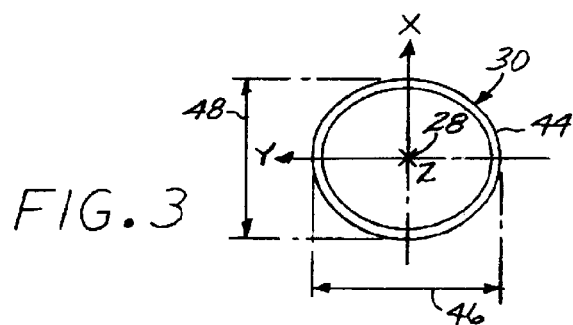
FIG. 3 is a sectional view of the missile of FIG. 1, taken on line 3—3.

The forward end 32 of the fuselage 22 has a forward-end periphery 38 of anamorphic symmetry about a first plane (the XZ plane in FIGS. 1–3) and a second plane (the YZ plane in FIGS. 1–3) perpendicular to the first plane. As used herein, "anamorphic" refers to a geometry wherein the article has a first mirror symmetry (i.e., a two-fold symmetry) about a first plane and a second mirror symmetry (i.e., a two-fold symmetry), different from the first mirror symmetry, about a second plane. The two perpendicular planes XZ and YZ intersect along a line, which is the Z axis and is also termed the "central axis", and coincides with the axis of elongation 28 in the preferred embodiment. The feature with anamorphic symmetry therefore cannot be of circular cross section, and is non-axisymmetric. The forward end 32 of the fuselage 22 has a forward-end width 40 measured perpendicular to the first (XZ) plane, and a forward-end height 42 measured perpendicular to the second (YZ) plane and different from the forward-end width 40. That is, the forward end 32 of the fuselage 22 is noncircular, is wider than it is high, and typically is of a somewhat oval shape. However, the forward end 32 of the fuselage is not of any particular mathematical form such as an ellipse or the like, nor is it necessarily (but may be) of a smoothly varying shape.

Figure 4:
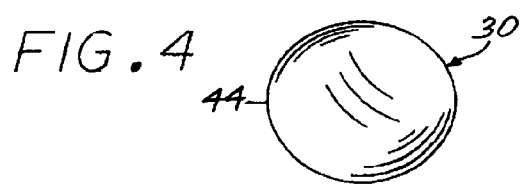
FIG. 4 is an enlarged front elevational view of the forward-facing window.

The missile system 20 further includes a forward-facing optical system 43, seen in greater details in FIGS. 5–7. The optical system 43 comprises the window 30 shown in FIGS. 1, 3, and 4 having anamorphic symmetry about the first (XZ) plane and the second (YZ) plane. The window 30 has a window periphery 44 with a window-periphery width 46 that is preferably substantially the same as the forward-end width 40 and a window-periphery height 48 that is preferably substantially the same as the forward-end height 42. That is, the window periphery is noncircular. The shape and size of the window periphery 44 is substantially the same as the shape and size of the forward-end periphery 38 of the fuselage 22, so that the two peripheries 44 and 38 match and superimpose when placed in facing contact. The window periphery 44 is affixed to the forward-end periphery 38 of the fuselage 22, preferably with a smoothly faired joint.

An optical corrector, in this preferred embodiment a transmission optical corrector 50, is positioned adjacent to a curved inner surface 52 of the window 30. (Reflective optical correctors may also be used in the present approach, but are less preferred.) An optical corrector shape of the optical corrector 50 is responsive to a shape of the window 30 to correct aberrations introduced into the image as a result of its passage through the window 30. That is, the optical corrector shape is selected or designed in response to the shape of the window 30. The transmission optical corrector 50 has anamorphic symmetry about the first (XZ) plane and the second (YZ) plane. A section through either the window 30 or the optical corrector 50, taken in the XY plane perpendicular to the central axis (the Z axis and axis 28), is noncircular and has anamorphic symmetry about the first plane and the second plane. The transmission optical corrector 50 may be fixed in relation to the window 30, as for example in FIG. 2 of U.S. Pat. No. 6,313,951, or movable in relation to the window 30, as for example in FIG. 3 of U.S. Pat. No. 6,313,951.

An optical train 54 is optionally but preferably positioned such that the transmission optical corrector 50 lies between the window 30 and the optical train 54. The optical train includes at least one optical element, such as a mirror and/or a lens, operable to alter an optical ray incident thereon. The usual function of the optical train 54 is to focus optical rays 60 from the viewed scene onto a sensor 58. In FIGS. 6–7, the optical train 54 is indicated as a solid catadioptric telescope 56 like that described in U.S. Pat. No. 6,462,889, but it may be of any operable type.

The sensor 58 is disposed to receive the optical rays 60 passing sequentially through the window 30, the transmission optical corrector 50, and the optical train 54 (where present). Desirably, the sensor 58 has a field of regard of at least about 10 degrees, and for some applications at least about 20 degrees, through the window 30, the transmission optical corrector 50, and the optical train 54 (where present). The present approach provides such high fields of regard. The sensor 58 may be either a manufactured sensor, such as a focal plane array (FPA), or a natural sensor such as a human eye. In the case of a manufactured sensor, the sensor 58 converts the incident optical rays 60 into electrical or optical signals that are transmitted to analysis electronics 62. The analysis electronics 62 analyzes the signals transmitted from the sensor 58 to identify and track targets in the field of view of the sensor 58, and to perform any other necessary functions.

Materials of construction for the window 30, the optical corrector 50, and the optical train 54 (where present) are known in the art for wavelengths of interest. For the visible wavelength range, the materials of construction are typically glass or plastic. For the infrared wavelength range, the materials of construction are transparent to infrared wavelengths and include, for example, magnesium fluoride, germanium, ALON, sapphire, zinc sulfide, and AMTIR3. Sensors 58 such as focal plane array sensors are known in the art for wavelengths of interest. Analysis electronics 62 is also known in the art.

The use of the anamorphic-symmetry window 30 and a corresponding anamorphic-symmetry transmission optical corrector 50 allows the portion of the fuselage 22 at and adjacent to the forward end 32 of the missile system 20, and having the nose window 30, to be anamorphic. U.S. Pat. No. 5,677,508 describes the advantages that result from an anamorphic symmetry in the fuselage 22 of a missile that is not disclosed to have a nose window, but did not provide any technique for extending those advantageous results to a missile with a nose window. The present combination of the anamorphic-symmetry window 30, anamorphic-symmetry transmission optical corrector 50, and anamorphic-symmetry forward end 32 of the fuselage 22 produces those advantageous results.

The anamorphic-symmetry window 30 may be considered as a lens with different focal lengths in the two directions of symmetry. The optical corrector 50 is structured to produce a net result wherein all optical rays 60 passing through the window 20 and the optical corrector 50 have substantially the same focal lengths. Using this principle, the shape of the optical corrector 50 responsive to the shape of the window 30 may be calculated using ray-tracing software such as the commercially available Code V™ program.

An exemplary calculation was performed using the Code V™ program. The mathematical form of the shape of an aspheric surface with anamorphic bilateral symmetry about each of two planes may be expressed as $$z = CUXx^2 + CUYy^2 / (1 + [1 - (1+KX)CUX^2x^2) - (1+KY)CUY^2y^2]^{1/2}$$
$$+ AR[(1-AP)x^2 + (1+AP)y^2)]^2 + BR[(1-BP)x^2$$
$$+ (1+BP)y^2)]^3 + CR[(1-CP)x^2 + (1+CP)y^2)]^4 + CR$$
$$[(1-DP)x^2 + (1+DP)y^2)]^5 \ldots$$

where z is the sag of the surface parallel to the z-axis,
CUX, CUY are the curvatures in x and y, respectively, with CUX=1/RDX (the radius of curvature in the x-direction, and CUY=1/RDY (the radius of curvature in the y-direction)
KX and KY are the conic coefficients in x and y, respectively, and
AR, BR, CR, and DR are the rotationally symmetric portion of the 4th, 6th, 8th and 10th order deformation from the conic, and
AP, BP, CP, and DP are the non-rotationally symmetric portion of the 4th, 6th, 8th and 10th order deformation from the conic.

In this calculation, the anamorphic shape of the window 30 was taken as fixed, because the shape of the window 30 is normally determined primarily by aerodynamic and not optical considerations. The window 30 was assigned an outer-surface shape with RDX=2.0625, RDY=1.3750, and all other outer-surface constants=0; a thickness of 0.065259; and an inner-surface 52 shape (the surface nearest the optical corrector) with RDX=1.96461, RDY=1.31898, and all other inner-surface constants=0. The window 30 was taken to be made of magnesium fluoride ($MgF_2$).

The anamorphic shape of the optical corrector 50 was optimized by allowing RDX, KX, RDY, KY, AR, and AP to vary, while keeping all other coefficients constant at zero. Improved precision in achieving exactly the same focal lengths of all of the optical rays may be obtained by allowing additional coefficients to vary, but the result would be a more-complex shape for the optical corrector 50 that would be more difficult and expensive to fabricate. For the present demonstration, the above approach was deemed sufficient. For the coefficients of the window 30 as described above taken to be constants and for the optical corrector 50 taken to be made of germanium, the values of the coefficients of the optical corrector 50 that were allowed to vary were calculated. For the outer-surface shape (that is, the surface nearest the window 30) of the optical corrector 50, RDX=1.17757, KX=0.009270, RDY=1.21686, KY=0.007198, AR=$0.208292 \times 10^{-3}$, and AP=0.517557. The optical corrector 50 was 0.10000 thick. For the inner-surface shape (that is, the surface furthest from the window 30) of the optical corrector 50, RDX=1.07813, KX=0.009276, RDY=1.11602, KY=0.007859, AR=$0.311540 \times 10^{-3}$, and AP=0.411869.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A system comprising an optical system, wherein the optical system comprises
- a curved window having anamorphic symmetry about a first plane and a second plane perpendicular to the first plane;
- an optical corrector adjacent to a curved inner surface of the window and having an optical corrector shape responsive to a shape of the window, wherein the optical corrector has anamorphic symmetry about the first plane and the second plane; and
- a sensor disposed to receive an optical ray passing sequentially through the window and the optical corrector.

2. The system of claim 1, wherein the window is a window in a flight vehicle.

3. The system of claim 1, wherein the anamorphic symmetry of a periphery of the curved window and the anamorphic symmetry of a periphery of the optical corrector are the same.

4. The system of claim 1, wherein the window has a central axis along an intersection of the first plane and the second plane, wherein the window has a window periphery, and wherein a window periphery width measured from the central axis perpendicular to the first plane is greater than a window periphery height measured from the central axis perpendicular to the second plane.

5. The system of claim 1, wherein the window has a central axis along an intersection of the first plane and the second plane, wherein the window has a window periphery, and wherein the window has a window periphery width measured from the central axis perpendicular the first plane that is greater than a window periphery height measured from the central axis perpendicular to the second plane, and wherein the system further includes
- an airframe fuselage having a fuselage forward end with a forward-end periphery of substantially the same shape and size as the window periphery.

6. The system of claim 5, wherein the window is joined to the fuselage forward end.

7. The system of claim 1, wherein the optical corrector is a fixed optical corrector.

8. The system of claim 1, wherein the optical corrector is a movable optical corrector.

9. The system of claim 1, wherein the sensor is a manufactured sensor.

10. The system of claim 1, wherein the sensor is a human eye.

11. The system of claim 1, wherein the optical corrector is a transmission optical corrector.

12. The system of claim 1, wherein the system further includes
- an optical train positioned such that the optical corrector lies between the window and the optical train, wherein the optical train includes at least one optical element operable to alter the optical ray incident thereon, and wherein
- the sensor is disposed to receive the optical ray passing sequentially through the window, the optical corrector, and the optical train.

13. The system of claim 12, wherein the sensor has a field of regard of at least about 10 degrees through the window, the optical corrector, and the optical train.

14. A system comprising
- an airframe fuselage having a fuselage forward end with a forward-end periphery of anamorphic symmetry about a first plane and a second plane perpendicular to the first plane, a forward-end width measured perpendicular to the first plane, and a forward-end height measured perpendicular to the second plane and different from the forward-end width; and
- a forward-facing optical system, wherein the optical system comprises
  - a window having anamorphic symmetry about the first plane and the second plane, wherein the window has a window periphery with a window periphery width that is substantially the same as the forward-end width and a window periphery height that is substantially the same as the forward-end height, and wherein the window periphery is affixed to the forward-end periphery of the airframe fuselage,
  - a transmission optical corrector adjacent to a curved inner surface of the window and having an optical corrector shape responsive to a shape of the window, wherein the transmission optical corrector has anamorphic symmetry about the first plane and the second plane,
  - an optical train positioned such that the transmission optical corrector lies between the window and the optical train, wherein the optical train includes at least one optical element operable to alter an optical ray incident thereon, and
  - a sensor disposed to receive the optical ray passing sequentially through the window, the transmission optical corrector, and the optical train.

15. The system of claim 14, wherein the airframe fuselage is a missile fuselage.

16. The system of claim 14, wherein the transmission optical corrector is a fixed optical corrector.

17. The system of claim 14, wherein the transmission optical corrector is a movable optical corrector.

18. The system of claim 14, wherein the sensor has a field of regard of at least about 10 degrees through the window, the transmission optical corrector, and the optical train.

* * * * *